(12) United States Patent
Lim et al.

(10) Patent No.: US 7,971,900 B2
(45) Date of Patent: Jul. 5, 2011

(54) SIDE AIRBAG APPARATUS FOR VEHICLES

(75) Inventors: Chang Hyun Lim, Bucheon-si (KR); Dae Young Kwak, Yongin-si (KR); Tae Ik Kwon, Hwaseong-si (KR); Soon Bok Lee, Hwaseong-si (KR); Anders Palo, Gothenburg (SE)

(73) Assignees: Hyundai Motor Company, Seoul (KR); Kia Motors Corporation, Seoul (KR); Autoliv Development AB, Vargarda (SE)

( * ) Notice: Subject to any disclaimer, the term of this patent is extended or adjusted under 35 U.S.C. 154(b) by 0 days.

(21) Appl. No.: 12/622,026

(22) Filed: Nov. 19, 2009

(65) Prior Publication Data

US 2011/0025034 A1  Feb. 3, 2011

(30) Foreign Application Priority Data

Jul. 31, 2009 (KR) .................. 10-2009-0070601

(51) Int. Cl.
B60R 21/207 (2006.01)
(52) U.S. Cl. .................. 280/730.2; 280/743.2
(58) Field of Classification Search ........... 280/730.1, 280/730.2, 743.1, 743.2
See application file for complete search history.

(56) References Cited

U.S. PATENT DOCUMENTS

| | | | | |
|---|---|---|---|---|
| 5,172,790 A * | 12/1992 | Ishikawa et al. | ............ | 180/268 |
| 5,499,840 A * | 3/1996 | Nakano | ............ | 280/730.1 |
| 5,636,862 A * | 6/1997 | Cheung et al. | ............ | 280/730.2 |
| 5,816,610 A * | 10/1998 | Higashiura et al. | ............ | 280/728.3 |
| 5,906,390 A * | 5/1999 | Phillion et al. | ............ | 280/728.3 |
| 6,364,347 B1 * | 4/2002 | Holdampf et al. | ............ | 280/730.2 |
| 7,192,070 B2 * | 3/2007 | Radu et al. | ............ | 296/24.34 |
| 7,240,915 B2 * | 7/2007 | Peng et al. | ............ | 280/730.2 |
| 7,549,672 B2 * | 6/2009 | Sato et al. | ............ | 280/730.2 |
| 7,712,766 B2 * | 5/2010 | Gutmann et al. | ............ | 280/728.2 |
| 7,819,423 B2 * | 10/2010 | Loibl et al. | ............ | 280/730.2 |
| 2003/0184133 A1 * | 10/2003 | Mic et al. | ............ | 297/115 |
| 2005/0236819 A1 * | 10/2005 | Riedel et al. | ............ | 280/730.2 |
| 2006/0119082 A1 * | 6/2006 | Peng et al. | ............ | 280/730.2 |
| 2006/0119083 A1 * | 6/2006 | Peng et al. | ............ | 280/730.2 |
| 2007/0096444 A1 * | 5/2007 | Bostrom et al. | ............ | 280/730.2 |
| 2008/0100044 A1 * | 5/2008 | Cho | ............ | 280/730.2 |
| 2009/0200775 A1 * | 8/2009 | Sugimoto et al. | ............ | 280/730.2 |

FOREIGN PATENT DOCUMENTS

| | | | |
|---|---|---|---|
| DE | 19635495 A1 * | 3/1998 | |
| GB | 2357999 A * | 7/2001 | |
| WO | WO 0149535 A1 * | 7/2001 | |

* cited by examiner

*Primary Examiner* — Faye M. Fleming
*Assistant Examiner* — Joseph Rocca
(74) *Attorney, Agent, or Firm* — Morgan, Lewis & Bockius LLP

(57) ABSTRACT

A side airbag apparatus provided with an airbag cushion installed in an armrest side portion of a seat frame of a vehicle, may include an airbag module having the airbag cushion therein; and a strap fastened at a first end portion thereof to a portion of the airbag cushion and fastened at a second end portion thereof to the seat frame or a bolster support wire frame, the strap surrounding a front portion of the seat frame.

6 Claims, 6 Drawing Sheets

SIDE AIRBAG APPARATUS FOR VEHICLES

CROSS-REFERENCE TO RELATED APPLICATIONS

The present application claims priority to Korean Patent Application Number 10-2009-0070601 filed on Jul. 31, 2009, the entire contents of which application is incorporated herein for all purpose by this reference.

BACKGROUND OF THE INVENTION

1. Field of the Invention

The present invention relates generally to side airbag apparatuses for vehicles and, more particularly, to a side airbag apparatus for vehicles which prevents passengers who sit on seats parallel to each other in the lateral direction of the vehicle body from colliding with each other.

2. Description of Related Art

Generally, an airbag apparatus is constructed such that an airbag cushion absorbs shock between a passenger and a vehicle body when the vehicle is involved in a collision, thus protecting the passenger.

Recently, the number of vehicles having side airbags installed in door side portions of vehicle seats has increased. Typically, when a vehicle is involved in a side collision, the side airbag is deployed into a space between the door and a passenger, thus protecting the head and the flank of the passenger from physical force generated by the vehicle collision.

Here, when the vehicle is involved in a side collision, shock between the vehicle door and the passenger can be absorbed by the above-mentioned side airbag apparatus. However, the conventional technique cannot absorb shock occurring due to collision between passengers who sit on seats parallel to each other in the lateral direction of the vehicle.

In an effort to overcome the above problem, required is a technique which has a support means for preventing a passenger from moving in the lateral direction of the vehicle when a collision occurs, thus preventing passengers who sit on seats parallel to each other in the lateral direction of the vehicle body from colliding with each other.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a side airbag apparatus for vehicles which can effectively prevent passengers who sit on seats parallel to each other in the lateral direction of the vehicle body from colliding with each other.

In an aspect of the present invention, the side airbag apparatus provided with an airbag cushion installed in an armrest side portion of a seat frame of a vehicle, may include an airbag module having the airbag cushion therein, and a strap fastened at a first end portion thereof to a portion of the airbag cushion and fastened at a second end portion thereof to the seat frame or a bolster support wire frame, the strap surrounding a front portion of the seat frame.

When the airbag cushion is deployed, the first end portion of the strap may move forwards while the portion of the airbag cushion is deployed toward an armrest by the strap, and the strap is stretched ahead of the seat frame.

The airbag module may include the airbag cushion, a housing disposed in the airbag cushion wherein the housing is mounted to the seat frame by a stud, an inflator mounted to the housing, and a cover that covers the airbag cushion and the first end portion of the strap.

The strap may cover a front portion of the airbag and the first end portion of the strap is fastened to the portion of the airbag cushion which faces a flank of a passenger when the airbag cushion is deployed.

A locking member may be provided on the second end portion of the strap and includes a hook having a "J" shape, the locking member being locked to the seat frame or the bolster support wire frame.

A mounting bracket may be provided on the second end portion of the strap, the mounting bracket being locked to the seat frame, wherein the seat frame includes a locking hole and the mounting bracket is coupled thereto by force-fitting.

A tether may be fastened to the second end portion of the strap by sewing and is locked to the seat frame by force-fitting, wherein the seat frame includes a locking hole and the tether includes an insertion portion and a locking portion, the insertion portion formed by folding and sewing an end portion of the tether to be inserted into the locking hole and the locking portion formed at a folded but not sewn portion of the end portion of the tether such that the locking portion is locked to the locking hole.

The second end portion of the strap may be fastened to the stud via a locking ring and the locking ring has a ring shape which is fastened to the end portion of the stud.

A webbing bracket may be provided on the second end portion of the strap, the webbing bracket being locked to the stud.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
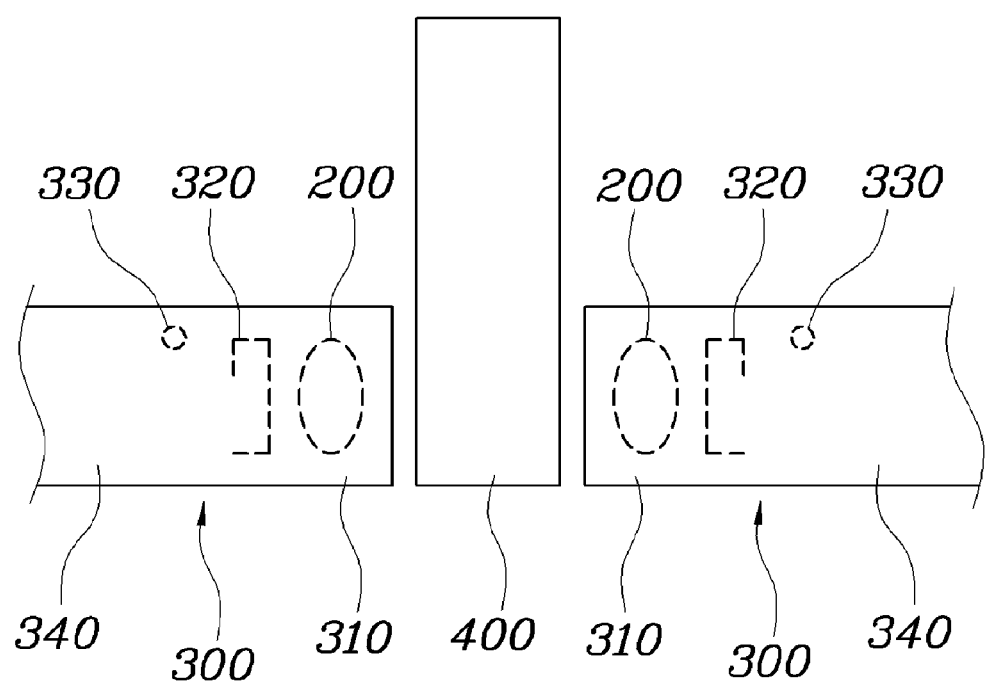
FIG. 1 is a view showing the installation of a side airbag apparatus for vehicles, according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, various exemplary embodiments of the present invention will be described in detail with reference to the attached drawings.

Figure 2A:
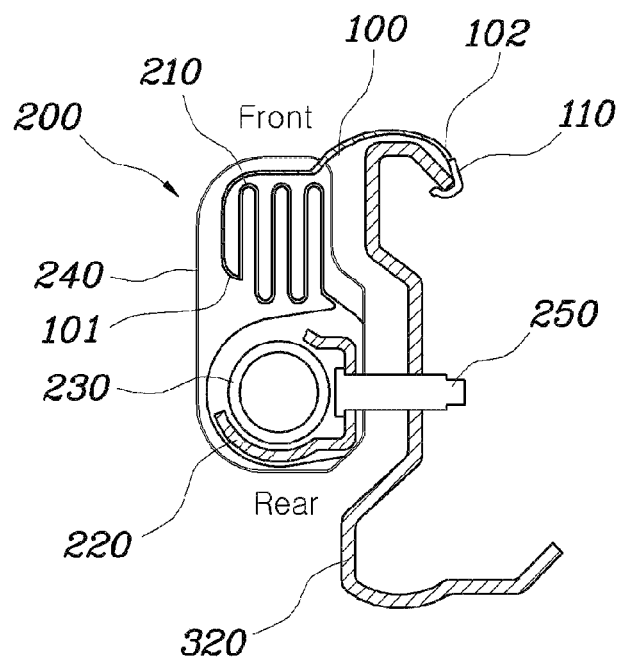
FIG. 2A is a view illustrating the construction of a side airbag apparatus for vehicles, according to a first embodiment of the present invention.
Figure 2B:
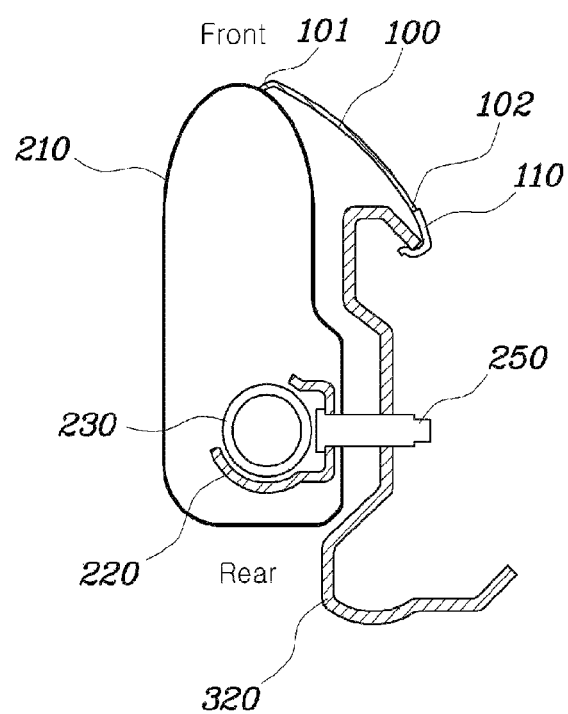
FIG. 2B is a view illustrating the deployment of an airbag cushion of the side airbag apparatus according to the first embodiment of the present invention.
Figure 3:
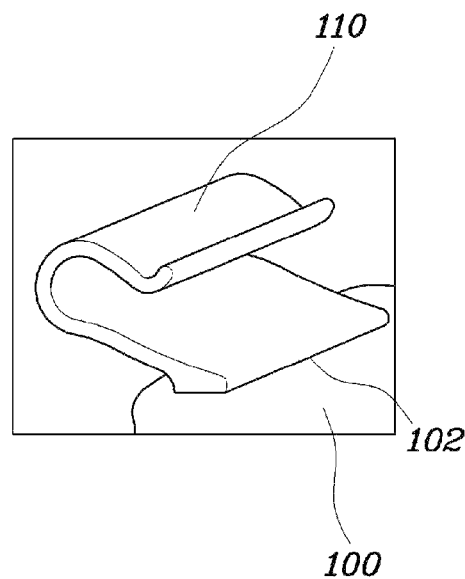
FIG. 3 is a view showing a part of a side airbag apparatus, according to a modification of the first embodiment of the present invention.

As shown in FIGS. 1 through 3, a side airbag apparatus according to an exemplary embodiment of the present invention effectively supports a passenger who moves towards the center of a vehicle, for example, towards an armrest 400, when the vehicle is involved in a side collision, thus preventing passengers who sit parallel to each other in the lateral direction of the vehicle body from colliding with each other.

To realize the present invention, the side airbag apparatus is installed in an armrest side portion 310 of a seat back 300 of the vehicle. A seat frame 320 is provided in the seat back 300. The seat frame 320 is covered with a seat cushion and supports the back of a passenger. Furthermore, a bolster support wire frame 330 is provided in the seat back 300.

In this embodiment, although the side airbag apparatus is illustrated as being installed in the armrest side portion 310 of each of the seat backs 300 which are disposed on opposite sides of the armrest 400, the present invention is not limited to this. In other words, the side airbag apparatus may be selectively installed in either of the armrest side portions 310 of the seat backs 300. In addition, the side airbag apparatus may be installed in not only the front seat but also the center of the rear seat.

The side airbag apparatus includes an airbag module 200. The airbag module 200 includes an airbag cushion 210 and a housing 220 which is disposed in the airbag cushion 210 and is mounted to the seat frame 320 by a stud 250. The airbag module 200 further includes an inflator 230 which is mounted to the housing 220, and a cover 240 which covers the airbag cushion 210.

In this embodiment, although the inflator 230 has been illustrated as being disposed inside the airbag cushion 210, the present invention is not limited to this. For example, the inflator 230 may be constructed such that it is connected to the airbag cushion 210 of the armrest side portion 310 or an airbag cushion (not shown) of a door side portion 340 through a separate gas supply tube to supply gas thereto.

The airbag cushion 210 is constructed such that when gas is fed from the inflator 230 to the airbag cushion 210 which has been folded, it can be inflated. The airbag cushion 210 is in the folded state under normal conditions and is coupled to the armrest side portion 310. When a vehicle collision occurs, the airbag cushion 210 is inflated. Thereby, the cover 240 is torn by the inflation force of the airbag cushion 210, and then the airbag cushion 210 is deployed outwards. The cover 240 which covers the airbag cushion 210 is preferably made of fabric or synthetic resin such that it can be easily torn when the airbag cushion 210 is inflated, but the material of the cover 240 is not limited to these.

To effectively support the passenger who moves towards the armrest 400 when the vehicle collision occurs, a first end portion 101 of a strap 100 is connected to the airbag cushion 210 which is in the folded state, and a second end portion 102 of the strap 100 is connected to the seat frame 320. Particularly, when the airbag cushion 210 is deployed, the first end portion 101 of the strap 100 moves towards the front side of the vehicle and supports the airbag cushion 210. To effectively implement this operation of the strap 100, it is preferable that the strap 100 be configured in such a shape as to cover the seat frame 320 before the airbag cushion 210 is deployed.

Therefore, when the airbag cushion 210 is deployed, the first end portion 101 of the strap 100 moves forwards, and the strap 100 is tightly stretched ahead of the seat frame 320. Thereby, the airbag cushion 210 is pulled and supported by the strap 100. Thus, the airbag cushion 210 can effectively support the passenger who moves towards the armrest 400 when a collision occurs.

The second end portion 102 of the strap 100 is fastened to the seat frame 320 by a locking member 110. The locking member 110 has a hook shape which is bent in a "J" shape. The locking member 110 is hooked to the seat frame 320.

It is preferable that the locking member 110 be configured such that the front end thereof is curved in a round shape. Due to this, the locking force between the locking member 110 and the seat frame 320 can be increased. More preferably, the front end of the locking member 110 has predetermined elasticity.

In this embodiment, although the strap 100 has been illustrated as being used as a means for connecting the airbag cushion 210 to the seat frame 320, a tether, a band, a cord, etc. may be used in place of the strap 100.

Figure 4:
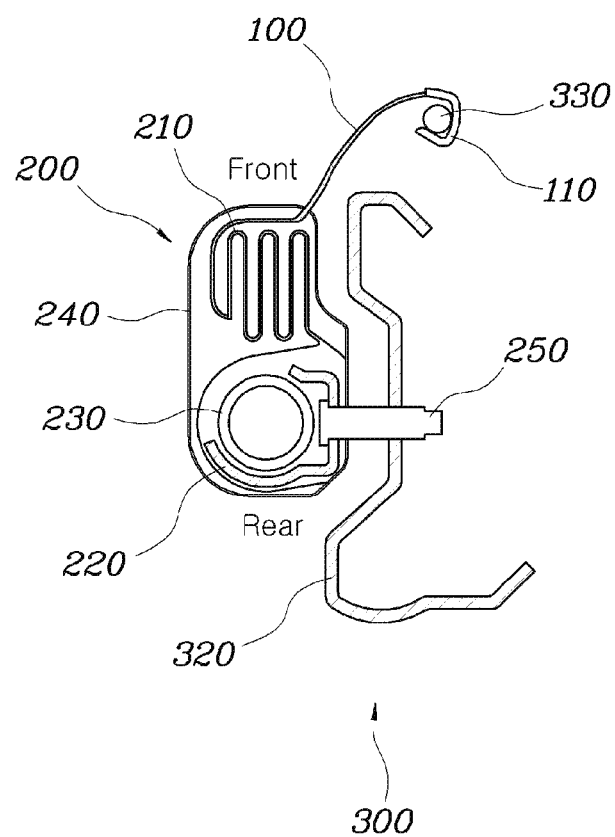
FIG. 4 is a view illustrating the construction of a side airbag apparatus for vehicles, according to a second embodiment of the present invention.

As shown in FIG. 4, the present invention may be constructed such that the locking member 110 of the strap 100 is fastened to the bolster support wire frame 330 of the seat back 300. Of course, a portion to which the locking member 110 is locked is not limited to the seat frame 320 or the bolster support wire frame 330, but it may be varied depending on the shape or construction of the seat frame 320.

Figure 5A:
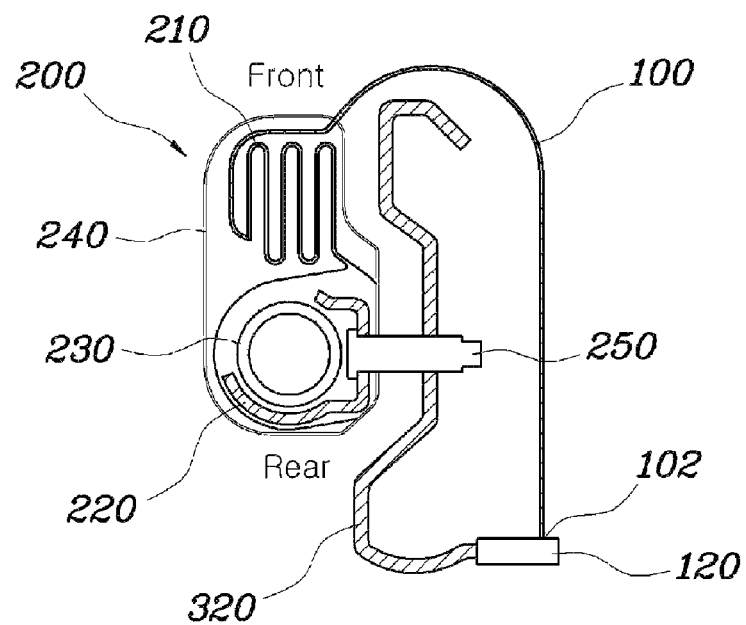
FIG. 5A is a view illustrating the construction of a side airbag apparatus for vehicles, according to a third embodiment of the present invention.
Figure 5B:
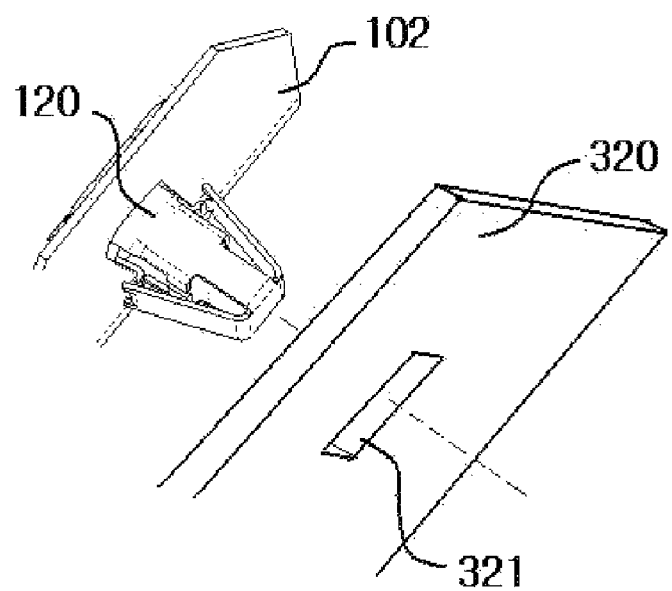
FIG. 5B is an enlarged view showing the coupling of a mounting bracket of the side airbag apparatus to a seat frame according to the third embodiment of the present invention.

As shown in FIGS. 5A and 5B, the side airbag apparatus according to an exemplary embodiment of the present invention may be constructed such that a mounting bracket 120 is provided on the second end portion 102 of the strap 100. The mounting bracket 120 is removably locked to a locking hole 321 formed in the seat frame 320. In the case where the second end portion 102 of the strap 100 is fastened to the seat frame 320, if the mounting bracket 120 is used, the assembly process can be more facilitated.

Figure 6A:
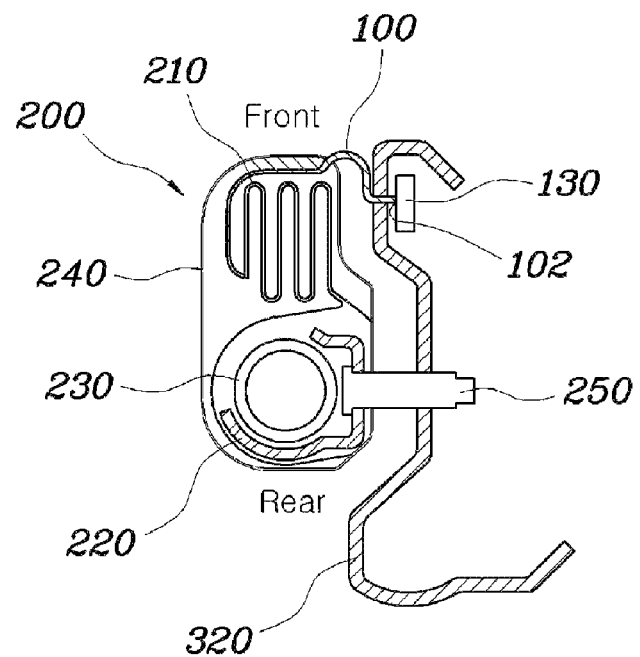
FIG. 6A is a view illustrating the construction of a side airbag apparatus for vehicles, according to a fourth embodiment of the present invention.
Figure 6B:
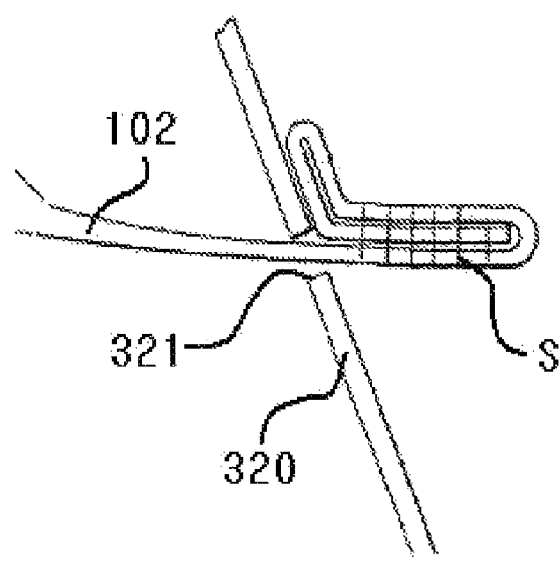
FIG. 6B is an enlarged view showing the coupling of a sewn tether of the side airbag apparatus to a seat frame according to the fourth embodiment of the present invention.

As shown in FIGS. 6A and 6B, the present invention may be constructed such that a tether 130 is fastened to the second end portion 102 of the strap 100 by sewing (S) and the strap 100 is locked to a locking hole 321 of the seat frame 320 by the tether 130. In this case, the tether 130 may be force-fitted into a gap formed in the seat frame 320. Alternatively, as shown in FIG. 6B, the separate locking hole 321 may be formed in the seat frame 320, so that the tether 130 is fitted into and locked to the locking hole 321.

The tether may include an insertion portion 140 and a locking portion 150. The insertion portion 140 is formed by folding and sewing an end portion of the tether 130 to be inserted into the locking hole 321 and the locking portion 150 is formed by not sewing the folded end portion of the locking portion 150 such that the locking portion 150 is locked to the locking hole 321.

Figure 7:
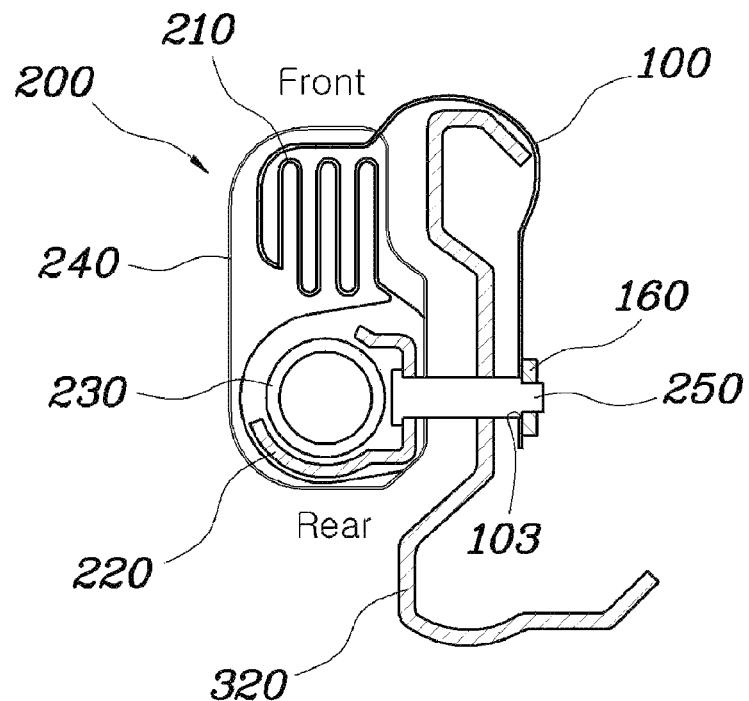
FIG. 7 is a view illustrating the construction of a side airbag apparatus for vehicles, according to a fifth embodiment of the present invention.

As shown in FIG. 7, the second end portion 102 of the strap 100 is fastened to the stud 250. A strap hole 103 may be formed in the second end portion 102 of the strap 100, so that the stud 250 is fitted into the strap hole 103 and secured via a locking ring 160. The locking ring 160 has a ring shape which is fastened to the end portion of the stud 250. Therefore, the strap 100 could be guided around the front corner of the seat frame 320 and secured to the stud 250 inside the seat frame 320 (on the opposite side as the airbag module 200) and secure via the locking ring 160.

Figure 8:
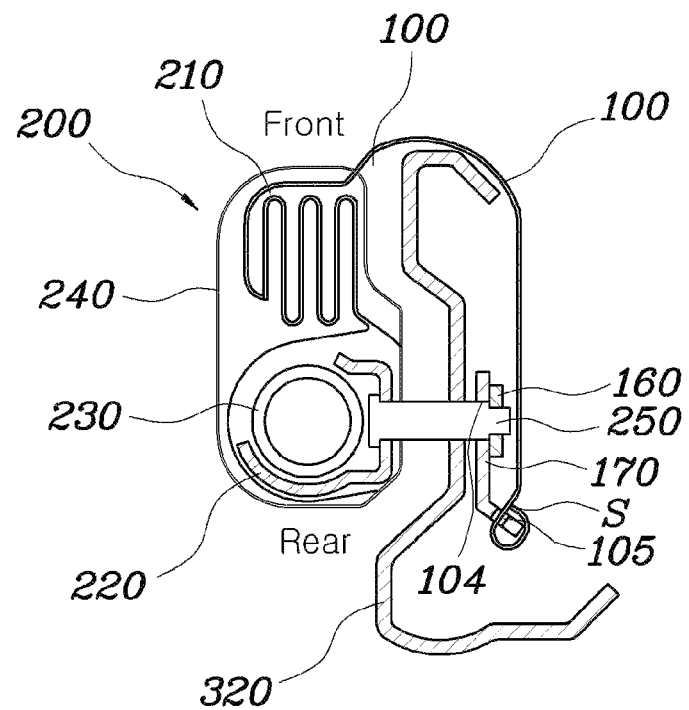
FIG. 8 is a view illustrating the construction of a side airbag apparatus for vehicles, according to a sixth embodiment of the present invention.

As shown in FIG. 8, a webbing bracket 170 is fastened to the second end portion 102 of the strap 100 and webbing bracket 170 is locked to the stud 250. A webbing hole 104 may be formed in a first end portion of the webbing bracket 170, so that the stud 250 is fitted into the webbing hole 104 and secured via the locking ring 160. A bracket hole 105 may be formed in a second end portion of the webbing bracket 170, so that the second end portion 102 of the strap 100 is fitted into the bracket hole 105 and secured by sewing (S).

The process of mounting the side airbag apparatus of the present invention to the seat frame will be explained in detail.

First, the first end portion 101 of the strap 100 is fastened to a portion of the airbag cushion 210 which is in the folded state. Thereafter, the airbag cushion 210 to which the first end portion 101 of the strap 100 is fastened is assembled with the armrest side portion 310 of the seat back 300.

The second end portion 102 of the strap 100 is fastened to the seat frame 320 in a shape in which the strap 100 surrounds the front portion of the seat frame 320. Here, the second end portion 102 of the strap 100 is fastened to the seat frame 320 by the above-mentioned locking means, such as the locking member 110, the mounting bracket 120, the tether 130, etc.

As such, the side airbag apparatus is mounted to the seat frame 320 in such a way that the front end 101 of the strap 100 is coupled to the folded airbag cushion 210 and the second end portion 102 thereof is fastened to the seat frame 320 in a shape in which the strap 100 surrounds the front portion of the seat frame 320. Therefore, the mounting process can be simplified, thus enhancing the productivity.

The operation of the side airbag apparatus, according to various exemplary embodiments of the present invention produced through the above process will be explained.

When a vehicle collision occurs, the inflator 230 is operated. Gas generated by the inflator 230 is supplied into the airbag cushion 210, thus inflating the airbag cushion 210.

When the airbag cushion 210 is inflated by the inflator 230, the cover 240 which has covered the airbag cushion 210 is torn by the inflation force of the airbag cushion 210. The airbag cushion 210 is deployed towards the front side of the vehicle.

Here, because the first end portion 101 of the strap 100 is coupled to the airbag cushion 210 and the second end portion 102 thereof is coupled to the seat frame 320, when the airbag cushion 210 is deployed, the first end portion 101 of the strap 100 moves towards the front side of the vehicle. Thus, the strap 100 is tightly stretched ahead of the seat frame 320.

As such, the strap 100 is disposed on the front of the seat frame 320 in the state of being tightly stretched. Therefore, the airbag cushion 210 which is completely deployed can effectively support the passenger who moves towards the armrest 400 when the collision occurs.

As described above, the present invention provides a side airbag apparatus which is provided in an armrest side portion of a seat frame and is constructed such that an airbag cushion is supported by a strap, thus preventing passengers who sit parallel to each other in the lateral direction of the vehicle body from colliding with each other.

Furthermore, in the present invention, the process of coupling the strap of the airbag cushion to the seat frame can be easily conducted using a locking means. Therefore, the work of assembling the side airbag apparatus with the seat frame can be more simplified.

For convenience in explanation and accurate definition in the appended claims, the term, "front" is used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise foams disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side airbag apparatus provided with an airbag cushion installed in an armrest side portion of a seat frame of a vehicle, the side airbag apparatus comprising:
   an airbag module having the airbag cushion therein and disposed adjacent to an outer surface of the seat frame; and
   a strap fastened at a first end portion thereof to an end portion of the airbag cushion and fastened at a second end portion thereof to an inner surface of a front portion of the seat frame, the strap surrounding the front portion of the seat frame.

2. The side airbag apparatus as set forth in claim 1, wherein when the airbag cushion is deployed, the first end portion of the strap moves forwards while the end portion of the airbag cushion is deployed by an inflator and guided toward an armrest by the strap, and the strap is stretched ahead of the seat frame.

3. The side airbag apparatus as set forth in claim 2, wherein the airbag module comprises:
   the airbag cushion;
   a housing disposed in the airbag cushion wherein the housing is mounted to the seat frame;
   the inflator mounted to the housing; and
   a cover that covers the airbag cushion and the first end portion of the strap.

4. The side airbag apparatus as set forth in claim 2, wherein the strap covers a front portion of the airbag and the first end portion of the strap is fastened to the portion of the airbag cushion which faces a flank of a passenger when the airbag cushion is deployed.

5. The side airbag apparatus as set forth in claim 4, wherein a locking member is provided on the second end portion of the strap and comprises a hook having a "J" shape, the locking member being locked to the seat frame or the bolster support wire frame.

6. The side airbag apparatus as set forth in claim 4, wherein a mounting bracket is provided on the second end portion of the strap, the mounting bracket being locked to the seat frame.

* * * * *